United States Patent [19]
Blees

[11] Patent Number: 6,066,370
[45] Date of Patent: May 23, 2000

[54] METHOD FOR PROVIDING A COATING ON POLYALKYLENE

[75] Inventor: Martin H. Blees, Eindhoven, Netherlands

[73] Assignee: U.S. Philips Corporation, New York, N.Y.

[21] Appl. No.: 09/206,438

[22] Filed: Dec. 7, 1998

[30] Foreign Application Priority Data

Dec. 10, 1997 [EP] European Pat. Off. .............. 97203865

[51] Int. Cl.[7] ...................................... B05D 3/06
[52] U.S. Cl. .......................... 427/558; 427/332; 427/595
[58] Field of Search ................................... 427/558, 595, 427/332

[56] References Cited

FOREIGN PATENT DOCUMENTS 03128947  10/1989  Japan .

*Primary Examiner*—Bernard Pianalto
*Attorney, Agent, or Firm*—Norman N. Spain

[57] ABSTRACT

A method is described for the adhesion of a coating (3) on a surface (2) of a substrate (1) of a polyalkylene, such as polypropylene. The method comprises a first deep UV exposure in an inert atmosphere, and a second deep UV exposure in an oxidizing atmosphere. Between the two exposure steps, the substrate surface (2) is rinsed with an organic solvent. Such a rinsing step increases the adhesion of the coating and reduces the total exposure time.

8 Claims, 1 Drawing Sheet

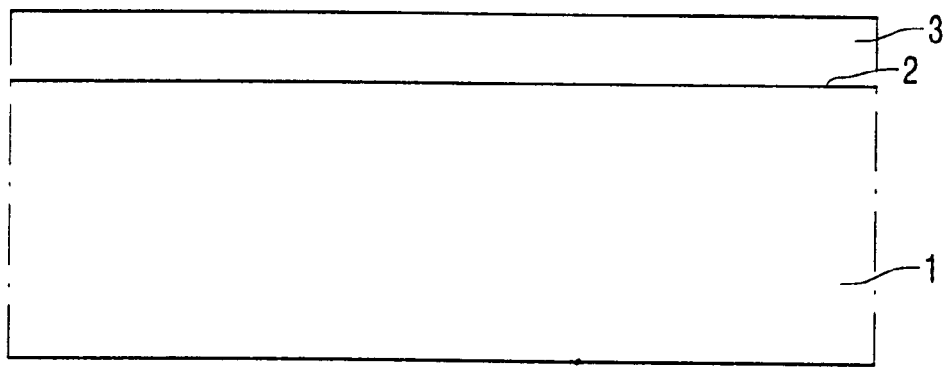

METHOD FOR PROVIDING A COATING ON POLYALKYLENE

BACKGROUND OF THE INVENTION

The invention relates to a method for providing a coating on a polyalkylene substrate. Polyalkylene, especially polypropylene, is a widely used plastic material because of its mechanical strength, high-impact resistance, rigidity and chemical resistance. A disadvantage is that coatings, such as decorative or label printings on polypropylene show a bad adherence without special measures, compared to polymers like ABS or polycarbonate. Known methods which are used to increase the adhesion of coatings on polypropylene are corona, plasma, UV/ozone, flame and chemical treatments. All these processes have certain disadvantages. A corona treatment cannot be used for curved surfaces. A plasma treatment requires expensive vacuum equipment. An UV/ozone treatment is a slow process, and a flame and chemical treatment could be dangerous in an industrial environment.

An example of a method which does not have the above disadvantages is disclosed in the abstract of JP-A-03-128947. In the known method, the polymeric substrate is irradiated with deep UV light in an oxidizing atmosphere, directly after a deep UV exposure in an inert atmosphere. A disadvantage of the known method is that the second exposure takes a relatively long time in order to obtain a good adhesion between a coating and a polyalkylene substrate surface.

SUMMARY OF THE INVENTION

It is an object of the invention to reduce the total exposure time, especially the time of the second exposure. Another object of the invention is to improve the adhesion between the coating and the substrate.

According to the invention these objects are achieved by a method as specified in the abstract of JPA-03-128947, characterized in that the substrate is rinsed with an organic solvent and dried between the first and second exposure steps. This measure enables the time of the second exposure to be reduced by a factor of ten, without adversely affecting the adhesion between the coating and the substrate. Moreover, the adhesion is of a quality which cannot be obtained without rinsing with an organic solvent.

For the UV source use can be made of a $Xe^*_2$ excimer lamp, which radiates between 160 and 190 nm, with a maximum emission at 172 nm. The reactor room, in which the substrate is exposed to UV radiation, is gastight, so that air from the environment cannot penetrate into this room.

During the first UV exposure, the substrate is present in a vacuum, or in an atmosphere of an inert gas such as argon or nitrogen.

Rinsing of the substrate is carried out with a solvent having a polarity between that of aliphatic hydrocarbons and ketones. In a preferential embodiment use is made of heptane or acetone.

Rinsing can be done in several manners, e.g. by immersing and spraying.

Subsequently the substrate is dried, if desired above room temperature by heating. Drying can be accelerated by blowing compressed air or nitrogen perpendicularly or parallel to the substrate.

During the second UV exposure, the substrate is present in an oxidizing atmosphere, comprising an oxygen-containing compound, such as oxygen, ozone or nitrous-oxide. The oxygen-containing compound may be diluted with an inert gas, such as nitrogen or argon. Water can also be used as the oxygen-containing compound, provided the UV exposure is carried out at wavelengths below 200 nm.

The coating on the substrate can be applied in air, and is e.g. an ink, lacquer, paint, or is obtained by a well known sol-gel process. The coating may be applied by known techniques, such as spin-coating, immersing, spraying, or by inkjet or (screen)printing. Optionally, the coating is cured at increased temperatures.

The substrate may be of any shape during the UV exposure steps, as long as the surface of the substrate to be coated can be exposed to UV light. The surface may be flat, spherical or cylindrical.

In a preferential embodiment of the invention, the polyalkylene of the substrate is a polypropylene, a polyethylene, or a copolymer of propylene and ethylene.

The method according to the invention can suitably be used in all applications in which a polyalkylene is used, especially a polypropylene. Examples are housings for products for personal care, like hair dryers, shavers; domestic appliances like vacuum cleaners, toasters, coffee makers, mixers, irons; lighting applications like luminaires; housings for sound and vision apparatus; automotive applications such as bumpers; packaging for food; tapes and adhesive tapes; furniture; toys; storage boxes.

BRIEF DESCRIPTION OF THE DRAWING

The invention will be further elucidated with the aid of exemplary embodiments, and the accompanying drawing, wherein:

The FIGURE diagrammatically shows a cross-sectional view of a substrate provided with a coating.

EXEMPLARY EMBODIMENT 1

The FIGURE shows a substrate 1 of a copolymer of ethylene and propylene (type P48M40 supplied by DSM). The surfaces 2 of two such substrates A and B are exposed to deep UV light in a closed reactor comprising a pure nitrogen atmosphere. The UV light is generated by a Xe lamp (supplier Heraeus Excimer Laboratory System) having a maximum emission at a wavelength of 172 nm. The power is 30 W/cm$^2$ at a distance of 3 cm from the lamp. The distance between the lamp and the surfaces 2 amounts to 1 cm. The radiation time is 30 seconds. After irradiation, the substrates A and B are removed from the reactor.

Both substrates A and B are rinsed with heptane and dried with a stream of dry nitrogen.

Both substrates are placed in the reactor again, which is now fed with a stream of nitrogen saturated with water vapour of 21° C., at a distance of 1 cm from the lamp. The surface 2 of substrate A is irradiated during 10 seconds, whereas the surface of substrate B is irradiated during 30 seconds, both with the Xe lamp having the same power as described above. After irradiation, the substrates A and B are removed from the reactor.

By spin-coating during 60 seconds at 800 rpm, a sol-gel mixture is applied onto the surfaces 2 of substrates A and B. The sol-gel mixture is prepared from 5.9 g 3-mercaptopropyltriethoxysilane, 3.9 g vinyltrimethoxysilane, and 2.9 g of a 0.9 molar solution of acetic acid in water. This mixture is stirred at 21° C. for 5 hours.

The sol-gel coating on the surfaces 2 is cured at 100° C. during 3 hours. The resulting coating 3 is a hybrid silica coating having a thickness of 4 Fm. The adhesion of the coating 3 to both substrates A and B is tested with the tape test (type Scotch 810, supplied by 3M). In the test, the coating 3 does not come off from the substrates A and B, which is an indication of a proper adhesion of the coating.

Comparative example (not according to the invention)

Exemplary embodiment 1 is repeated with two substrates C and D, with the only difference being that the first UV exposure is immediately followed by the second UV exposure and the rinsing step with heptane is omitted. The coating obtained is formed into small droplets, leaving parts of the surface 2 uncoated. These droplets can easily be removed: the adhesion is almost zero.

EXEMPLARY EMBODIMENT 2

In this experiment the time of the second exposure, which is varied between 0 and 60 seconds is investigated. Moreover, after the first exposure the substrate is rinsed with heptane, or acetone, or not rinsed at all. The other parameters are the same as in exemplary embodiment 1. After the second exposure the substrate 1 is provided with a layer of black inkjet ink (type Imaje 5101BK), which is applied by spin-coating for 20 seconds at 2000 rpm. The layer is dried in air at room temperature for 15 minutes, after which a coating 3 is formed having a thickness of 2 Fm . The adhesion of the coating is tested with the tape test. The results are disclosed in Table 1. A "+" indicates that the adhesion of the coating meets the tape test requirements, whereas a "−" indicates that the tape test requirements are not met. The Table shows that without rinsing with an organic solvent, the time of the second exposure should be at least 20 seconds, whereas with a rinsing step between the first and second exposure, a time of the second exposure of only 2 seconds is sufficient.

TABLE 1

| time of second exposure (s) | rinsing with heptane | rinsing with acetone | no rinsing |
|---|---|---|---|
| 0 | − | − | − |
| 2 | + | + | − |
| 5 | + | + | − |
| 10 | + | + | − |
| 20 | + | + | + |

TABLE 1-continued

| time of second exposure (s) | rinsing with heptane | rinsing with acetone | no rinsing |
|---|---|---|---|
| 30 | + | + | + |
| 60 | + | + | + |

According to the invention a method is provided for the adhesion of a coating on a polyalkylene substrate, in which method the total UV exposure time, especially the second exposure time, is decreased with respect to known methods.

I claim:

1. A method for providing a coating on a substrate, which substrate comprises a polyalkylene, and which method comprises the following consecutive steps:
   a) a first exposure of the substrate to UV radiation having a wavelength below 200 nm, in an inert gas phase;
   b) a second exposure of the substrate with UV radiation having a wavelength below 260 nm in a gas phase comprising an oxygen containing compound;
   c) providing the coating; characterized in that the substrate is rinsed with an organic solvent and dried between the first and second exposure steps.

2. A method as claimed in claim 1, characterized in that the polyalkylene is a polymer selected from the group consisting of a polypropylene, a polyethylene and a copolymer of propylene and ethylene.

3. A method as claimed in claim 1, characterized in that the oxygen-containing compound is selected from the group consisting of oxygen, ozone, water and nitrous oxide.

4. A method as claimed in claim 1, characterized in that water is used as the oxygen-containing compound, and that the second exposure step is carried out using UV radiation having a wavelength below 200 nm.

5. A method as claimed in claim 1, characterized in that the substrate is rinsed with an organic solvent which has a polarity between and including that of aliphatic hydrocarbons and ketones.

6. A method as claimed in claim 5, characterized in that heptane or acetone is used as the organic solvent.

7. A method as claimed in claim 1, characterized in that the coating is obtained by means of a sol-gel process.

8. A method as claimed in claim 2 wherein the polyalkylene is a polypropylene.

* * * * *